United States Patent [19]

Fleckenstein et al.

[11] 4,313,825
[45] Feb. 2, 1982

[54] CONTROL SYSTEM FOR METER ACTUATED REGENERATION IN A WATER TREATMENT SYSTEM

[75] Inventors: Andrew J. Fleckenstein, Brookfield; Michael C. Mortl, Glendale, both of Wis.

[73] Assignee: L. W. Fleckenstein, Inc., Brookfield, Wis.

[21] Appl. No.: 236,993

[22] Filed: Feb. 23, 1981

[51] Int. Cl.³ .................. C02F 5/00; G05G 17/00
[52] U.S. Cl. .................................. 210/89; 74/3.52;
200/35 R; 200/38 R; 210/138; 210/190
[58] Field of Search ............ 74/3.52; 200/35 R, 38 R;
210/88, 138, 139, 190, 191, 89

[56] References Cited

U.S. PATENT DOCUMENTS

| | | | |
|---|---|---|---|
| 2,310,978 | 2/1943 | McGill et al. | 210/88 |
| 3,278,424 | 10/1966 | Griswold | 210/191 X |
| 3,457,792 | 7/1969 | Fleckenstein | 74/3.52 |
| 3,509,998 | 5/1970 | Pellett et al. | 210/98 |
| 3,570,520 | 3/1971 | Sodi | 210/88 X |
| 3,732,738 | 5/1973 | Grout | 74/3.52 |
| 3,742,768 | 7/1973 | Fleckenstein et al. | 74/3.52 |
| 3,747,420 | 7/1973 | Weber et al. | 74/3.52 X |
| 3,874,412 | 4/1975 | Fleckenstein et al. | 74/3.52 X |
| 4,210,532 | 7/1980 | Loke | 210/190 X |

FOREIGN PATENT DOCUMENTS

| | | | |
|---|---|---|---|
| 1536994 | 8/1968 | France | 210/139 |
| 2009628 | 2/1970 | France | 210/139 |

Primary Examiner—Robert H. Spitzer
Attorney, Agent, or Firm—McWilliams, Mann & Zummer

[57] ABSTRACT

This invention relates to a control system for regeneration of a water treatment system in which a water meter monitors water usage and mechanically drives a water volume wheel to an operative position to call for regeneration when a predetermined volume of water has been treated and then automatically resets itself. A timer wheel driven by a motor is included within the control system such that the timer wheel and the water volume wheel coact to activate the regeneration cycle mechanism at a predetermined time after a predetermined volume of water has passed through the water meter. The mechanism is adjustable relative to the water treating capacity of the treatment system and the condition of the water being treated so as to be able to vary the predetermined volume of water treated which will call for regeneration.

7 Claims, 8 Drawing Figures

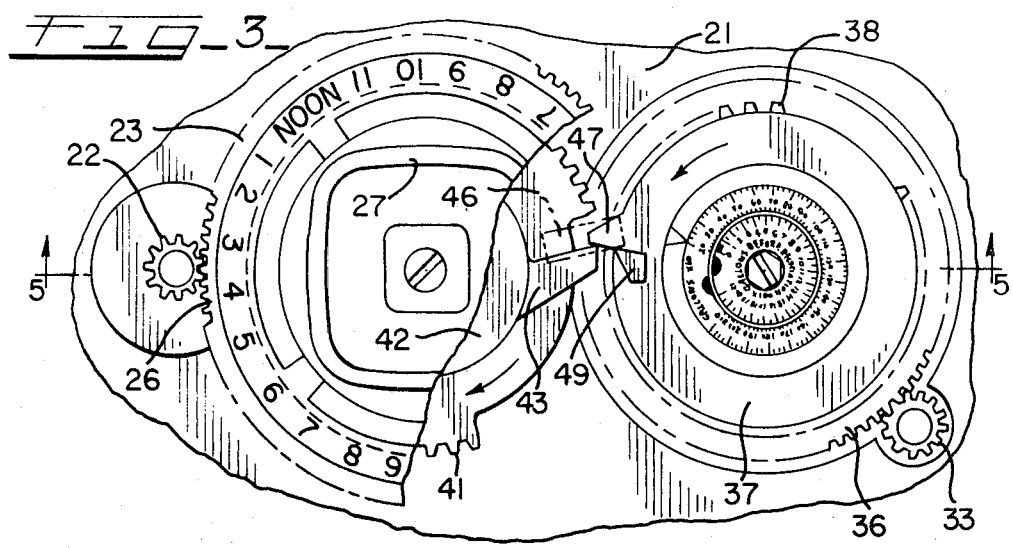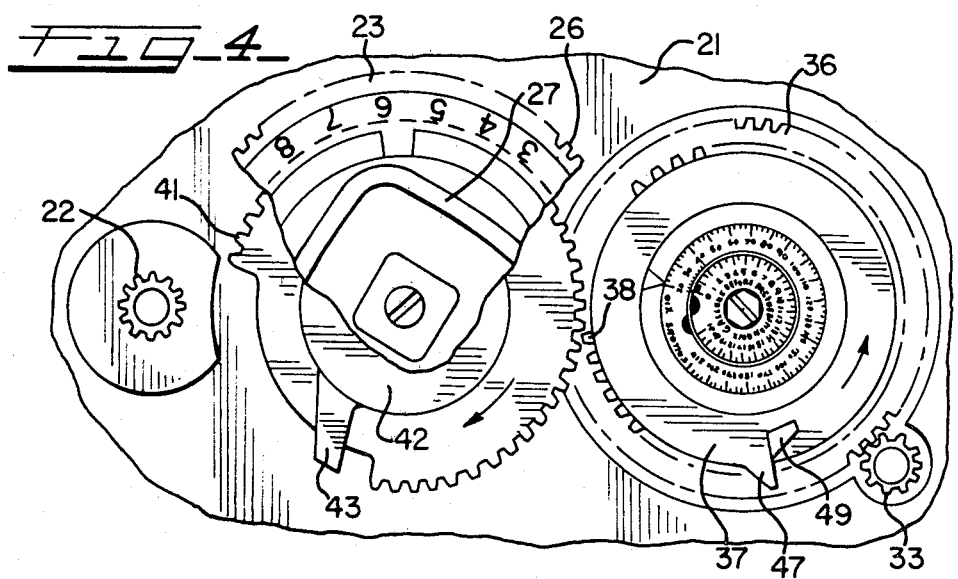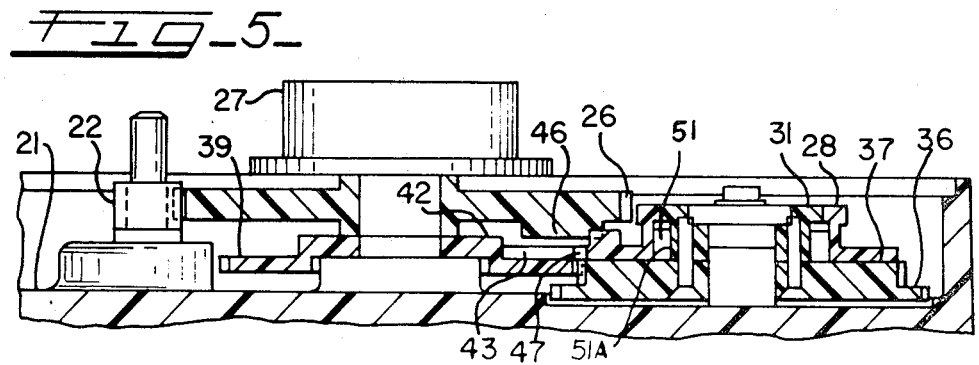

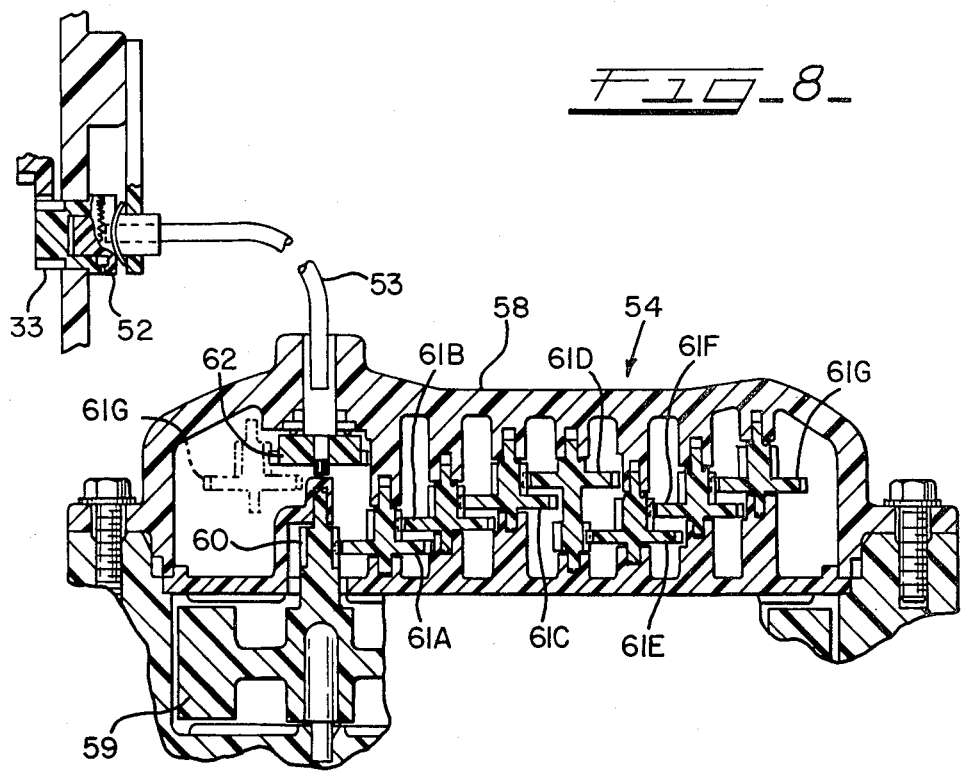
FIG_8_
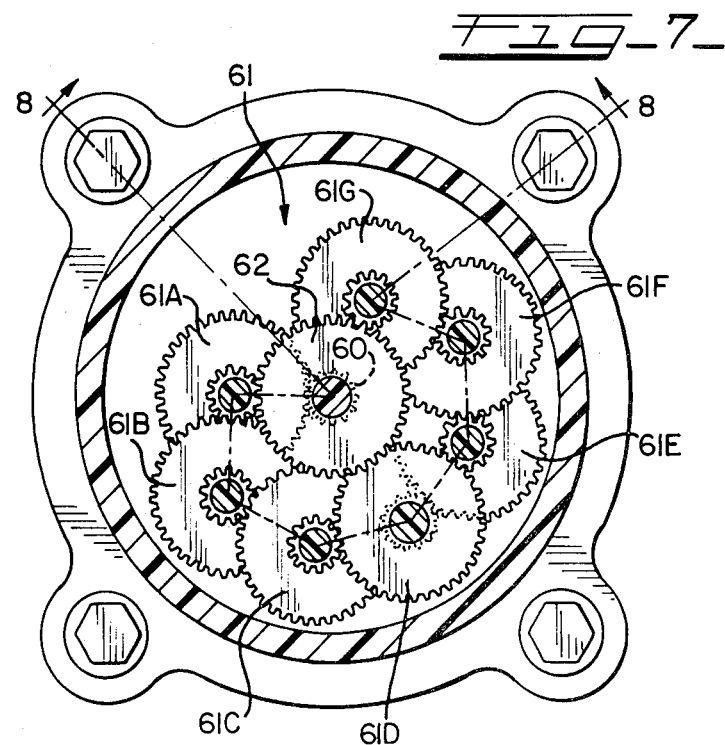
FIG_7_

CONTROL SYSTEM FOR METER ACTUATED REGENERATION IN A WATER TREATMENT SYSTEM

BACKGROUND OF THE INVENTION

This invention relates to the field of water conditioning systems and is primarily concerned with providing a control system for starting a regeneration cycle at a predetermined time after a predetermined volume of water has been treated.

Heretofore, the majority of water treatment systems have been set for regeneration periods based on a fixed period of time. Such systems include a "skipper wheel" set for the desired number of days between regeneration cycles so that the system regenerates on the prescribed schedule regardless of the amount of water used between regenerations. If the system was set for one, or two, or three days, or more, the regeneration period occurred at the same time on the same daily schedule as prescribed by the skipper wheel setting irrespective of water usage.

At times more water was used than anticipated and this resulted in the system delivering hard water before a regeneration was called for by the skipper wheel setting. At other times, less water was used than was anticipated, but the regeneration cycle proceeded in accordance with the setting with the result that this cycle caused salt in the brine tank to be wasted, as well as water and a resin bed, which was only partially depleted, was regenerated unnecessarily. Such arrangements are illustrated and described in prior Fleckenstein U.S. Pat. Nos. 3,457,792, 3,742,768, and 3,874,412.

Other systems such as shown in U.S. Pat. Nos. 2,078,361, 2,310,978, 3,396,845, 3,509,998, 3,570,520, and 3,891,552 have initiated regeneration after the treatment of a predetermined volume of water. These systems, however, could not control the time of day at which regeneration took place since regeneration was controlled solely by volume of treated water. In some of these systems the time of day when regeneration took place was unimportant since two resin tanks were used, the one being regenerated being phased out of the system and the other tank supplying treated water continuously. Obviously such an arrangement is far more expensive and complex than applicant's arrangement as set forth herein. Furthermore, if a single resin tank is used, it is deemed important to initiate regeneration at a time when little or no water is being used since once the regeneration process beings, only untreated water will be dispensed. Most often regeneration is scheduled to occur in the late evening or early morning hours when the occupants of the house are sleeping and no water usage takes place.

SUMMARY OF THE INVENTION

The present invention provides a control system which includes a timer wheel driven by an electric motor and a water meter that monitors treated water usage and drives a water volume wheel to a position to call for regeneration only when regeneration is needed, as indicated by the usage of a predetermined volume of water. The timer wheel and the water volume wheel coact to activate the regeneration cycle mechanism at a predetermined time only after a predetermined volume of water has passed through the water meter. Means are provided so as to be able to vary the time of day when regeneration takes place and the volume of water usage which will initiate regeneration. The water meter includes an impeller and a gear reduction unit which drives a flexible shaft to mechanically drive the water volume wheel to a regeneration initiating position.

DESCRIPTION OF THE DRAWINGS

The foregoing and other and more specific features of the invention are achieved by the structure and arrangement illustrated in the accompanying drawings wherein

FIG. 3 is a detail view to larger scale, illustrating the controls by means of which the system may be set for operation;

FIG. 4 also is a detail view of the controls showing them in a further position;

FIG. 5 is a transverse sectional view of the line 5—5 of FIG. 3 showing the controls and operating gears;

FIG. 7 is a horizontal sectional view through the gear-type reduction system utilized in the water meter for the control system; and FIG. 8 is a transverse sectional view on the line 8—8 of FIG. 7, but laid out more clearly to show the operative relationship of the gears comprising the reduction system.

DESCRIPTION OF THE PREFERRED EMBODIMENT

Figure 1:
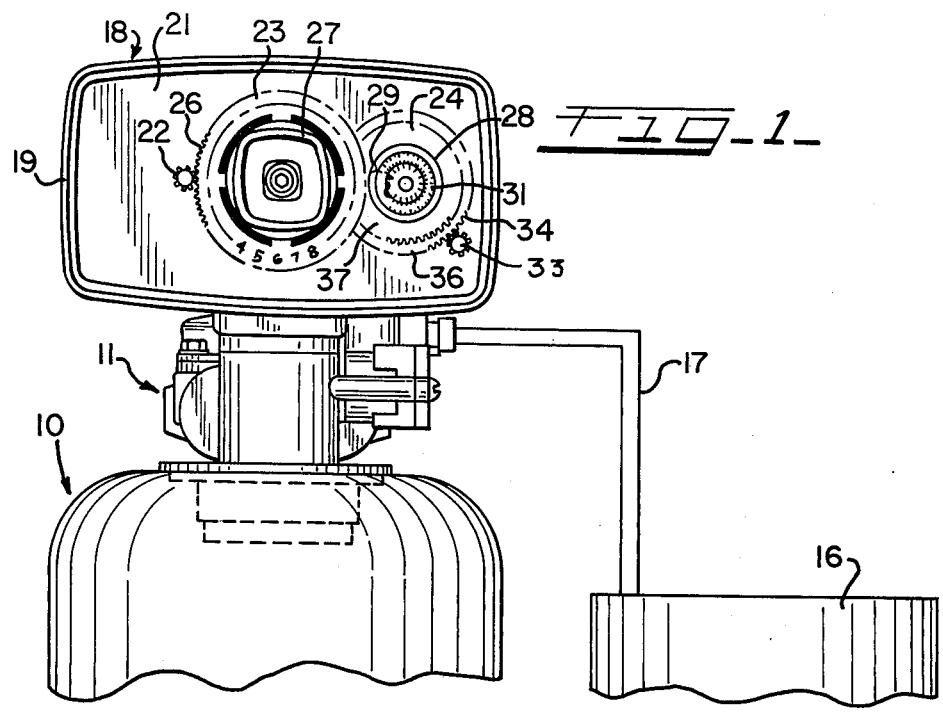
FIG. 1 is a general elevational view of a water treatment system incorporating the controls of this invention for the regeneration of the treatment system.
Figure 2:
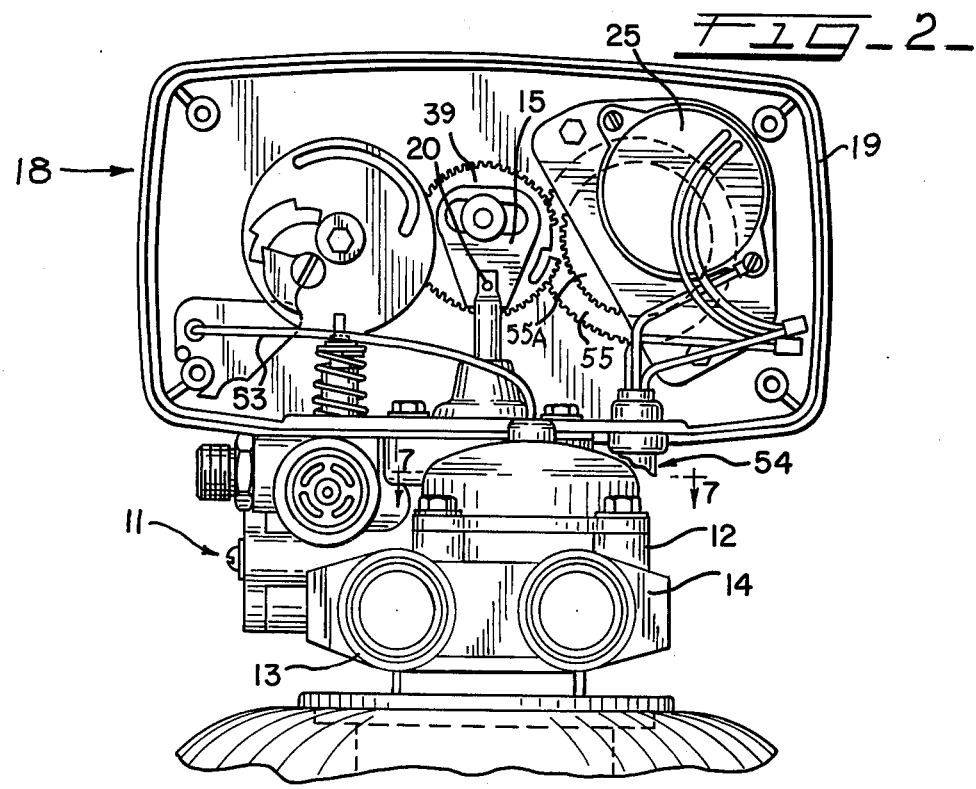
FIG. 2 is a rear elevational view of the control mechanism disposed in a control head.

As shown in FIG. 1, the numeral 10 generally designates a typical water softening tank having a control valve 11 fixed to the top thereof. As shown in FIG. 2, the control valve includes a housing 12 which defines an inlet 13 for receiving water to be treated and an outlet 14 through which treated water flows. The control valve is connected to a brine tank 16 through a conduit 17 for regeneration.

A control mechanism generally designated as 18 is fixed to the top of the valve and is adapted to drive the piston of the valve through plate 15 and valve stem 20 at selected intervals through a slowly moving and uninterrupted reciprocating cycle. As the piston moves, the various passages of the valve are connected for control of regenerative operations such as backwashing, brining, slow rinsing, rapid rinsing, and brine tank filling, respectively, before the valve returns to the service position, all as more fully disclosed in U.S. Pat. No. 3,742,768.

The control mechanism 18 includes a housing 19, preferably of durable plastic. The housing carries a face plate 21 which may carry instructions for operation on its outermost surface. A drive pinion 22, shown in FIG. 1, is disposed outwardly of the face plate 21 and is driven by a timing motor 25, shown in FIG. 2. The timing motor 25 drives gear 55 and gear 55A. Also disposed outwardly of the face plate 21 is a time-of-day wheel 23 and a water volume wheel 24. The time-of-day wheel 23 defines a plurality of teeth 26 around its outer periphery adapted to mate with and be driven by the pinion wheel 22. The pinion 22 may be mounted for axial shifting movement to disengage it from the gear teeth of the time-of-day wheel and thus allow "setting"

of the time-of-day wheel for the correct time. The time-of-day wheel also contains on its outer surface positional gradations to represent the hours of the day from noon to 11:00 a.m. P.M. and A.M. indicia are furnished for easy readability. A manual regeneration knob 27 is provided to effect manual regeneration of the system if desired.

The water volume wheel 24 includes an outer annular rotatable knob 28 with an arrow 29 or other indexing marks affixed thereon and an inner water volume selector 31 indexed to read from about 200 gallons of treated water to about 2100 gallons. Alternatively, the rotatable knob may bear index marks corresponding with the number of people in the household and the inner selector 31 may be indexed to read grains of hardness corresponding to the water to be treated. The outer knob 28 is selectively rotatable with respect to the water volume selector 31 so as to choose or vary the predetermined volume of water to be treated before regeneration is called for depending upon the capacity of the unit. When the water volume required to initiate regeneration has been selected, the selector 31 and the knob 28 are rotationally fixed together by a pin connection not shown.

Figure 6:
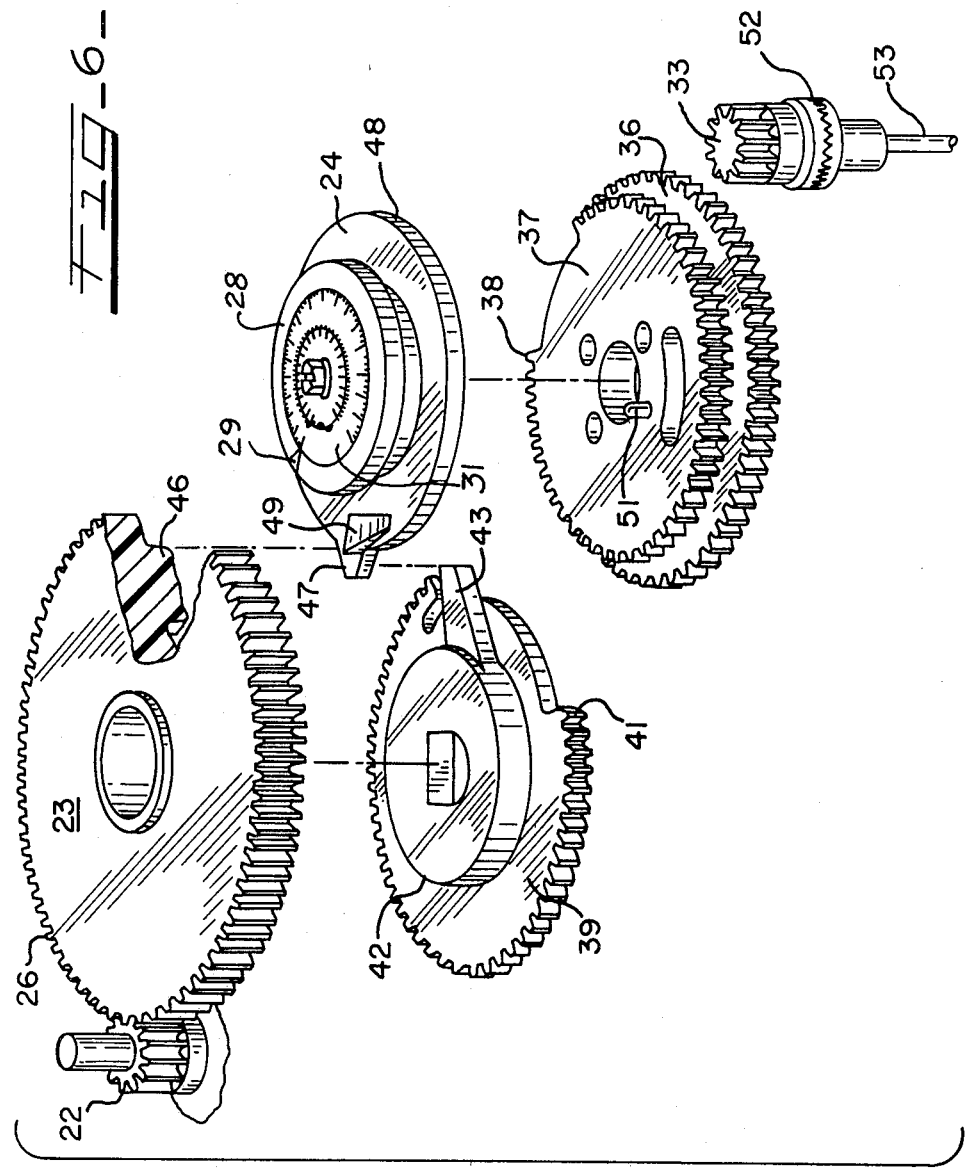
FIG. 6 is an exploded perspective view of the operating gears shown in the three preceding figures indicating their relative positions in the system.

A drive pinion 33 is shown extending from the face plate 21 and engaging a plurality of teeth 34 formed on the outer periphery of gear 36. As best shown in FIG. 6, a segment gear 37 of lesser diameter than gear 36 is positioned adjacent to and rotatably connected to gear 36 and defines a plurality of teeth 38 on a portion of its outer periphery. Gears 36 and 37 can be formed as a single member if desired.

The control mechanism also includes a segment gear 39 defining a plurality of teeth 41 which extend around a portion of the gear periphery and are adapted to mesh and engage the teeth 38 of the gear 37. An annular boss 42 extends upwardly from the face of the gear 39. A start arm 43 extends generally radially from the boss 42. A downwardly extending lug 46 depends from the lower face of the wheel 23.

A trip finger 47 extends radially outwardly from an annular surface 48 formed on the water volume wheel 24. A sloping protrusion 49 is disposed extending upwardly of the wheel 24 adjacent the trip finger 47. A pin 51 extends upwardly of the gear 37 and engages an aperture 51A in the bottom surface of water volume selector 31 to lock gears 36, 37 and volume selector 31 together for rotary movement. A spring arrangement, not shown, is provided to resiliently bias the water volume wheel 24 downwardly over the gear 37. When a change in the volume of treated water required to call for regeneration is desired, the knob 28 is grasped and pulled upwardly against the spring force and rotated until the arrow 29 or other indexing mark is aligned with the appropriate indicator. The volume indicator 31 does not rotate by virtue of its connection with pin 51.

A clutching arrangement 52 is shown in FIG. 6 disposed between a rotary flexible shaft 53 and the drive pinion 33 so as to allow override during regeneration, manual cycling, or when idling. The arrangement illustrated is of the ratchet type, but any of an endless number of friction or magnetic or hydraulic or spring clutches would be operative.

FIGS. 7 and 8 illustrate a water meter, generally referred to as 54, which includes a housing 58 and an impeller 59 which is positioned in the flow path of water being treated. The impeller 59 is shown here associated with the fluid outlet, but it would be equally effective if associated with the inlet or anywhere else so long as the impeller is positioned to accurately monitor the actual volume of water passing through the water softener.

A gear train 61 is shown driven by the impeller and connected to drive the gear 62 which is connected to the flexible shaft 53 which in turn is connected through clutch 52 to drive pinion 33. The gear train 61 is a standard gear reduction unit and includes gears 61A, 61B, 61C, 61D, 61E, 61F, 61G, and 62.

The operation of the meter-controlled regeneration device is as follows:

Water to be treated flows through inlet 13 and treated water flows out through outlet 14 causing the impeller 59 to rotate in direct relationship to the flow of water. This rotation is transmitted through the gear train 61 (61A-G) to the output gear 62. Output gear 62 turns the drive pinion 33 by means of the flexible cable 53 connected to the clutching arrangement 52 at some constant gallons-per-revolution rate. The drive pinion 33 causes the water volume wheel 24 to rotate clockwise as viewed in FIGS. 3 and 4 and this wheel 24 will continue to rotate very slowly as long as water is flowing through the meter 54.

As shown in FIG. 3, when the predetermined volume of water has been treated, the trip finger 47 has assumed a position to contact start arm 43. The water volume wheel will cease to rotate due to the clutching arrangement 52 which allows the flexible cable 53 to freewheel. The water volume wheel 24 will idle in this position until the predetermined time of day for regeneration has arrived. At this time cycle-starting lug 46 contacts sloping protrusion 49 and causes it to rotate. This rotation causes trip finger 47 to impart a rotational force upon the start arm 43 which brings the piston drive gear 39 into running mesh with drive gear 55A. The motor then causes the control to proceed through a regeneration cycle.

While the regeneration cycle is underway, segment gear 39 is also rotating and its teeth 41 come into running mesh with teeth 38 of gear 37. This meshing causes rotation of water volume wheel 24 until the gear teeth 38 and 39 lose mesh due to missing teeth on gear 37. This is the automatic resetting feature of this device.

Note that during the resetting of the water volume wheel 24, the drive pinion 33 also must rotate. This is made possible due to the clutching arrangement 52. The relationship of the missing teeth on gear 37 to the trip finger 47 is adjustable to obtain the volume of water required for a particular installation.

It is to be noted that in the preferred embodiment described herein the coaction between the water volume wheel and the timer wheel was by means of a direct mechanical connection. It is contemplated, however, that other embodiments could be constructed within the scope of applicant's invention wherein the coaction between the water volume wheel and the timer wheel was an indirect connection of more complicated design. Such arrangements are contemplated as being within the scope of the appended claims.

What is claimed is:

1. A control for regeneration of a water treatment system having an inlet for receiving water to be treated and an outlet for dispensing treated water, said control system including a regeneration cycle mechanism, a timer wheel driven by a motor settable for a given time of day, a water meter disposed in constant communication with either said inlet or said outlet and continuously driven by the passage of water through said meter, and a water volume wheel mechanically driven constantly by said water meter such that said water volume wheel is rotatable to an operative position upon the passage of a predetermined volume of water through said water meter during its continued operation so as to coact with said timer wheel at a predetermined time such that regeneration will automatically take place after the treatment of a predetermined volume of water but will begin only at a predetermined time of day.

2. A control as in claim 1 including means associated with said water volume wheel to vary the predetermined volume of water which will cause rotation of the water volume wheel to its operative position.

3. A control as in claim 1 in which means are included whereby the regeneration cycle mechanism can also be activated manually.

4. A control as in claim 1 including means associated with said timer wheel to selectively vary the time of day when regeneration takes place.

5. A control as in claim 1 including means to automatically reset the position of the water volume wheel during the regeneration process.

6. A control as in claim 1 including a flexible drive member connected between said water meter and said water volume wheel.

7. A control as in claim 1 including a clutch disposed between said water meter and said water volume wheel so as to allow said water volume wheel to idle after it has reached its operative position.

* * * * *